April 22, 1947.  C. D. HAVEN  2,419,400
MULTIPLE GLAZING UNIT
Filed Jan. 11, 1943  4 Sheets-Sheet 1

Inventor
CHARLES D. HAVEN.
By Frank Fraser
Attorney

April 22, 1947.   C. D. HAVEN   2,419,400
MULTIPLE GLAZING UNIT
Filed Jan. 11, 1943   4 Sheets-Sheet 2

Inventor
CHARLES D. HAVEN.
By Frank Fraser
Attorney

April 22, 1947.  C. D. HAVEN  2,419,400
MULTIPLE GLAZING UNIT
Filed Jan. 11, 1943  4 Sheets-Sheet 3

Inventor
CHARLES D. HAVEN.
By Frank Fraser
Attorney

April 22, 1947.  C. D. HAVEN  2,419,400

MULTIPLE GLAZING UNIT

Filed Jan. 11, 1943  4 Sheets-Sheet 4

Inventor
CHARLES D. HAVEN,
By Frank Fraser
Attorney

Patented Apr. 22, 1947

2,419,400

UNITED STATES PATENT OFFICE 2,419,400

MULTIPLE GLAZING UNIT

Charles D. Haven, Toledo, Ohio, assignor to Libbey-Owens-Ford Glass Company, Toledo, Ohio, a corporation of Ohio Application January 11, 1943, Serial No. 471,987

11 Claims. (Cl. 20—56.5)

The present invention relates broadly to multiple glazing and more particularly to glazing units in which two or more sheets or plates of glass are secured together in spaced relation to provide a unitary structure.

The multiple glazing unit herein provided is of the type known as "Thermopane" in which two sheets of glass are maintained in spaced, substantially parallel relation by metallic separator means secured to the glass sheets through the intermediary of metallic coatings on the glass to provide a sealed air space therebetween. When Thermopane, or any other type of sealed air space construction, is subjected to wide changes of atmospheric pressure or temperature, high pressure differences can exist between the exterior and interior of the unit. These pressure differences exert a strain on the separator means and, if great enough, breakage of the glass sheets can result unless the glass is unusually heavy, or rapid or slow progressive break down of the edge construction can take place. When reasonable pressure differences exist, Thermopane has been found to give excellent service in use. Therefore, it is to provide for the unusual conditions met with that this invention is concerned.

In order to prevent excessive differences in pressure between the inside and outside of a multiple glazed unit, the separator means has sometimes been provided with vents through which the interior of the unit is in communication with the atmosphere. By venting the air space to normal atmospheric pressures and conditions, no pressure differences can exist between the inside and outside of the unit. Thus, Thermopane so constructed may be used for any condition of pressure change or abnormal temperature change without the use of undue glass thicknesses.

However, the practical difficulty with vented or semi-sealed air space constructions comes from water vapor entering the interior of the unit from the atmosphere. Attempts to reduce the water vapor content in the air space have usually been done by inserting small cartridges containing a desiccant in the air space or connecting an externally located cartridge by tubes, etc., with the air space. In such cases, the amount of the desiccant used is small, the life of the unit relatively short, and replacement must be made more or less often, depending on conditions and use. Furthermore, the replacement of a cartridge is not ordinarily done until condensation has taken place on the glass surfaces. When this happens, efflorescence or staining of the glass surfaces has already occurred and the unit must be taken apart for cleaning or the unit discarded because of glass stain.

According to this invention, the multiple glazing unit is designed to provide a sufficient amount of desiccant or dehydrating material for long life and to eliminate the use of fixed, inside-sealed or tube-connected cartridges. Preferably, the desiccant used consists of a relatively large number of granules, such as silica gel, Activated Alumina, calcium chloride and the like, arranged within the edge construction of the unit and exposed to the air within the space between the glass sheets so that vapor pressure will cause any moisture or vapor in the air between the sheets to seek the desiccant and be absorbed. If desired, the separator means may also be vented to the atmosphere so that the air entering or leaving the space between the glass sheets will have to pass through the desiccant.

Among the various uses to which the units of this invention may be placed are for glazing airplanes, railroad cars, low or high temperature cabinets for special uses and conditions, and large store fronts to maintain the glass sheets in an unbowed condition.

Other objects and advantages of the invention will become more apparent during the course of the following description, when taken in connection with the accompanying drawings.

In the drawings, wherein like numerals are employed to designate like parts throughout the same:

Figure 1:
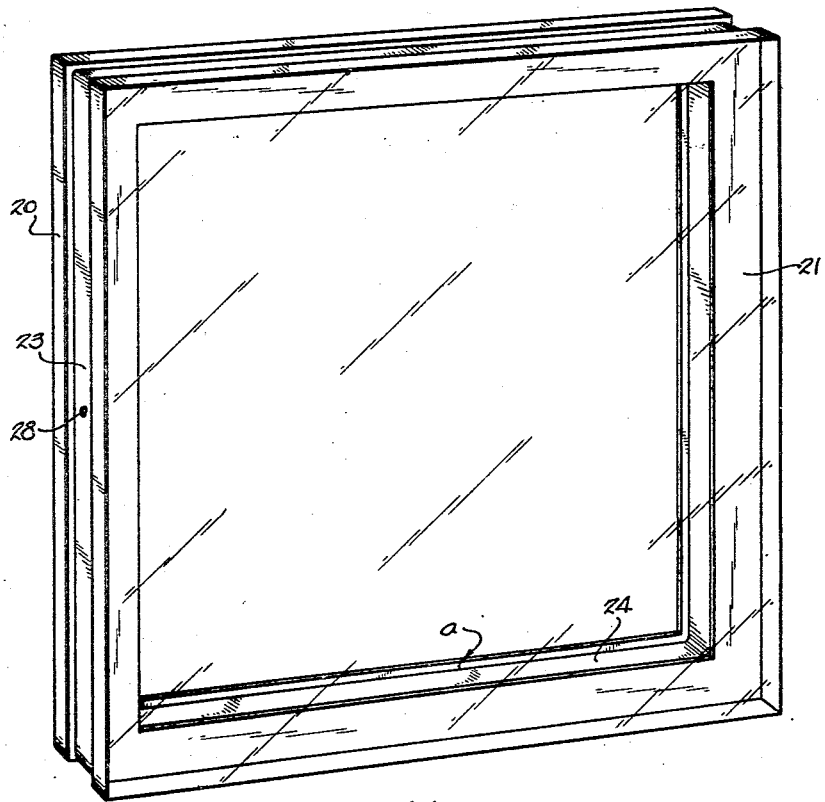
Fig. 1 is a perspective view of one form of multiple glass sheet glazing unit constructed in accordance with the invention.
Figure 2:
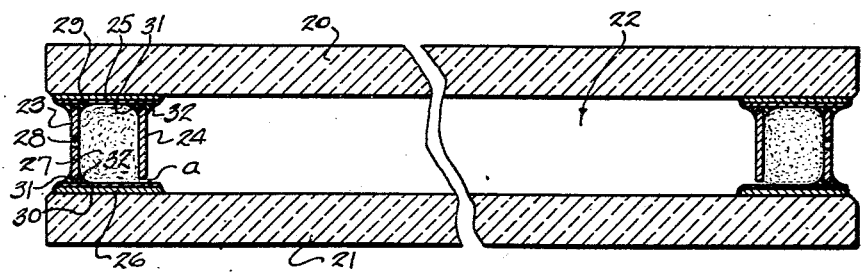
Fig. 2 is a vertical transverse section therethrough.

Referring particularly to Figs. 1 and 2, there is disclosed a multiple glass sheet glazing unit comprising two sheets or plates of glass 20 and 21 arranged in spaced, substantially parallel relation to provide an air space 22 therebetween. This air space is formed by the provision of two spaced metal separator strips 23 and 24 arranged at each edge of the unit and joined to the glass sheets 20 and 21 through the intermediary of metallic coatings 25 and 26 adherent to the said sheets.

The space or chamber between the separator strips 23 and 24 is filled with a suitable desiccant or dehydrating material 227, preferably consisting of a relatively large number of granules of silica gel, activated alumina, calcium chloride and the like. It will be noted that the outer separator strip 23 is secured to both of the glass sheets 20 and 21, while the inner separator strip 24 is secured only to the glass sheet 20, its opposite edge being spaced slightly from the metallic coating 26 on glass sheet 21 to provide a relatively narrow crack or gap $a$ existing all around the unit which permits the air in the air space 22 to freely contact the dehydrating material 27. Thus, vapor pressure would quickly cause any vapor which found its way into the air space to travel to the desiccant and be absorbed. One or more openings 28 are also preferably, though not necessarily, provided in the outer separator strip 23 through which air passes into and from the air space 22 as temperature or pressure conditions require.

In practice, assuming that the air within the space between the glass sheets is under sufficient pressure to cause it to pass outwardly through the opening 28 it must first pass through the dehydrating material 27 before it reaches the atmosphere at the opening. On the other hand, if the pressures are such that air tends to flow into the space between the glass sheets, atmospheric air will enter at the opening 28, pass through the dehydrating material 27, and then into the air space through the gap $a$. In this way, the moisture will be removed from the air so that when the air enters the space between the glass sheets it will be thoroughly dry. It will thus be seen that as pressures vary the moist air will leave the space between the glass sheets and be replaced by dry air. By maintaining the air dry, fogging, frosting and sweating of the inner surfaces of the glass sheets will be prevented.

As will be readily appreciated, two or more sheets of glass can be fabricated into a glazing unit of this character, giving one or more spaces between adjacent glass sheets as occasion may require. Therefore, while the invention has been illustrated in the drawings and will be herein described as applied to a two-sheet unit, it will be understood that the invention is in no way confined to any particular number of glass sheets used or spaces between the sheets.

In the manufacture of this type of glazing unit, it has been customary to form the metallic coatings 25 and 26 on the glass sheets 20 and 21 of pure copper or a suitable copper alloy preferably sprayed in a molten condition upon the glass which has been previously heated to a desired temperature. However, the invention is not limited to the use of any particular metal or metal alloy. It is also preferred that the separator strips 23 and 24 be made of lead and that the lead strips and metallic coatings on the glass be joined together by layers of solder 29 and 30 or other inorganic bonding material. In soldering the parts together, there is provided, in effect, a sweat job and the materials are so controlled both as to composition and form that reinforcing or strengthening fillets or accumulations of solder 31 and 32 are formed on both sides of each separator strip in joining it to the respective glass sheet.

Figure 3:
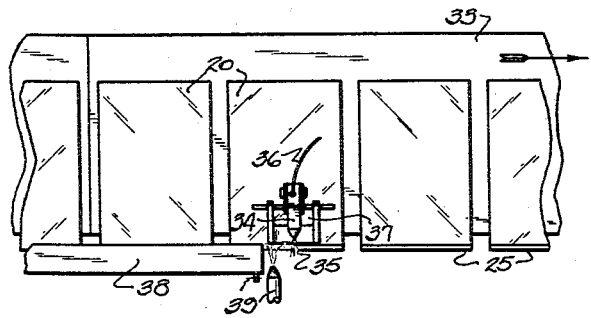
Fig. 3 is a fragmentary plan view of one form of apparatus which may be used for heating the marginal edge portions of the glass sheets and for applying the metallic coatings thereto.

In Fig. 3 is illustrated one type of apparatus and method which may be used in heating the glass sheets and in applying the metallic coatings 25 and 26 thereto. As shown, glass sheets 20 to be metallized rest horizontally upon and are carried forwardly by a suitable conveyor 33 beneath a metallizing gun 34. This gun may be of any construction capable of producing a spray of metal 35 which can be directed upon the pre-selected portions of the glass sheets moving thereunder. However, it is preferred that a spray gun be used in which a metal wire 36 is fed into the gun, melted, and sprayed in fine particles upon the glass. The deposit of metal upon the glass is not only controlled by the relative position of the gun with respect to the glass, speed of wire through the gun, and speed of movement of the glass, but also by a guard member 37 which may be used for this purpose.

Before the metal is sprayed upon the glass, the marginal portions of the glass sheets are first heated to the desired temperature. The exact temperature used will vary somewhat with the size and thickness of glass, but in all cases where heating is resorted to, care should be exercised to avoid warpage of the glass. For ordinary plate and window glass, it has been found that a temperature of between 500 and 600 degrees F. is satisfactory although this temperature may be varied to suit the particular metallizing operation. In fact, in some cases it may not be desired to heat the glass at all.

As the glass sheet 20 is carried along by the conveyor 33 and before it reaches the metal spray gun 34, the forward marginal edge portion of the sheet, which projects beyond the conveyor, passes through an electrical heating device 38. The number of heaters and length of heating zone are dependent upon the speed of the machine and exact operating temperatures desired. After the glass sheet passes beyond the heating device 38 and just before the metal is sprayed thereon, the marginal edge portion thereof may be subjected to the action of one or more burners 39 which heat the surface of the glass to the desired maximum temperature for the reception of the metal spray.

The heating means is so controlled that when the glass reaches a position under the metal spray gun, it is within the predetermined temperature range desired. The conveyor 33 is preferably moved continuously forwardly and successive sheets of glass 20 are presented progressively to the spray of metal 35 issuing from the gun 34.

Although it is preferred that the marginal edge portion only of the glass sheet be heated, the entire sheet may be heated if desired, and in some cases this may be found more satisfactory. The invention is also not limited to the use of any particular air pressure for atomization of the metal and, likewise, a wide range of flame and spray metal temperatures can be used. Various gases and combinations of gases can also be used in the spraying operation, such as, for example, acetylene, propane, and hydrogen, in combination with oxygen.

Figure 4:
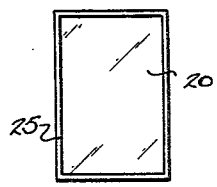
Fig. 4 is a face view of one of the glass sheets with the metallic coating applied entirely around the margins thereof.

After one edge or marginal portion of the glass sheet has been coated with metal, the remaining edges or marginal portions thereof are similarly treated before fabricating the glass into a double glazing unit. A glass sheet 20 having the four marginal portions thereof provided with the metallic coating 25 is shown in Fig. 4.

Figure 5:
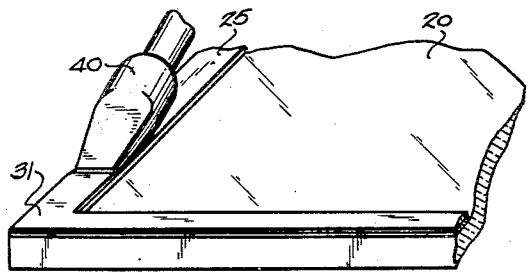
Fig. 5 is a fragmentary perspective view illustrating the depositing of a coating of solder upon the metallized border on the glass sheet.

After the metallic coating 25 has been applied around the margins of the glass sheet, it is then further prepared by applying thereto a layer of solder 31 (Fig. 5), which consists preferably of a low melting point solder. To insure a firm bond, a suitable soldering flux, of which there are a large number, is preferably used to get a permanent satisfactory union between the solder layer 31 and metallic coating 25 on the glass. This flux can be applied to the metallic coating by means of a brush or in any other desired manner. However, after the metallic coating 25 has been applied to the glass, there is a tendency toward oxidation thereof. Therefore, to facilitate tinning of the metal coated glass, this oxidation should be removed before the flux is applied and for this purpose the metallic coating may be subjected to a fine hydrogen flame. The flux treated metallic coating may then be coated with the layer of solder 31 in the manner shown in Fig. 5, wherein a soldering iron 40 is being run over the metallic coating 25 to leave the solder layer thereon.

Figure 6:
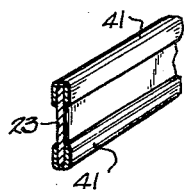
Fig. 6 is a fragmentary perspective detail view showing a metal separator strip precoated with solder.

After the two sheets of glass 20 and 21 (Fig. 2) have been provided with the metallic coatings 25 and 26 and layers of solder 29 and 30, they are adapted to be secured together in spaced, substantially parallel relation by means of the interposed metal separator strips 23 and 24. The separator strips 23 and 24 are preferably formed of lead or a lead alloy and to enable joining of the separator strips to the metal coated glass sheets there is applied to both sides of the outer strip 23 along the marginal edges thereof, a deposit of solder 41 (Fig. 6). A similar solder deposit is secured to only one edge of the inner separator strip 24.

The solder deposits 41 applied to the edges of the separator strips consist preferably of a low melting point solder having a wide plastic range with a minimum plastic temperature. The use of a low melting point solder is also of benefit during the time of sweating the soldered metallic coatings on the glass to the soldered lead separator strips whereby a low temperature iron may be used without melting down the lead strips.

Figure 7:
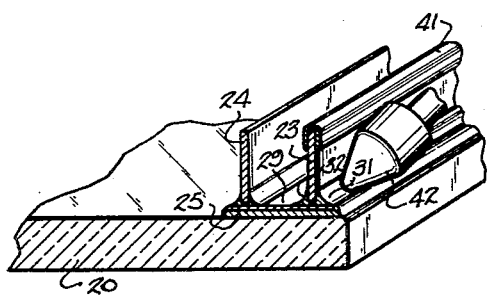
Fig. 7 is a fragmentary perspective view showing the bonding or sweating of the metal separator strips to one of the glass sheets.

To join the prepared separator strips 23 and 24 to one of the glass sheets, they are associated therewith substantially as shown in Fig. 7. An electric iron 42 or other heating means may be employed to elevate the temperature of the solder deposits 41 and the solder coating 29 to induce flowing of the solder to produce a fillet 31 on one side of each separator strip and a second fillet 32 on the opposite side of said strip. In this way, the solder surrounds the edges of the separator strips giving what may be called a sweat joint and producing fillets on both sides of the separator strips to give a balanced type of joint capable of standing strain and stresses in both directions laterally of said separator strips. A suitable type flux may also be used to aid in the sweating of the separator strips to the metallic coatings on the glass sheets.

For purposes of illustration, the fillets 31 and 32 are shown as separate from the solder coating 29 on the metallized border 25 (Fig. 7). While these solder deposits are of course independent of one another initially, part of the solder being applied originally to the separator strips and the other solder being applied to the metallized coating on the glass, during the joining together the solder blends or amalgamates into a single mass or volume of solder permanently adherent to the separator strips and metallized coatings on the glass and shaped as fillets for mechanical strength.

In joining the separator strips to the first sheet of glass, it is obviously possible to apply the soldering iron to both sides of the separator strips for soldering purposes, but this, of course, is impossible when the second sheet of glass is being joined to the outer separator strip. However, by preparing the outer separator strip with substantial deposits of solder on both sides thereof, the heat applied on one side of the strip is sufficient to cause proper flowing of the solder on both sides. That is, as shown in Fig. 7, proper control of temperature application with the iron 42 will result in the formation of not only the fillet 31 upon that side of the separator strip in contact with the iron but will also result in formation of the fillet 32 on the opposite side of the separator strip.

Figure 8:
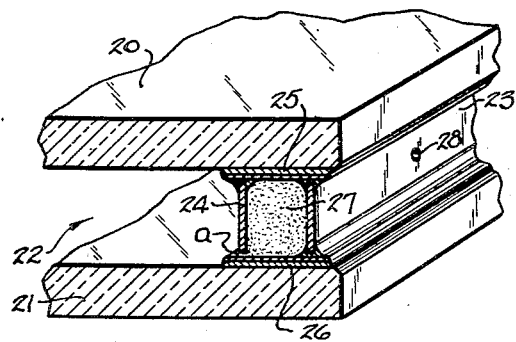
Fig. 8 is a fragmentary transverse section through the glazing unit after the metal separator strips have been secured in position between the two sheets of glass and the space between the separator strips filled with a desiccant.

After the separator strips have been joined to the first sheet of glass 20, the space between the said strips is filled with the dehydrating material 27 and the assembly so formed is then secured to the second sheet of glass 21 as illustrated in Fig. 8, the soldering job being completed by operating the iron or other heating element on the exterior coating of solder 41 carried by the outer separator strip. This, as has already been explained, will result in sweating together or joining of the separator strip and prepared metal coatings on the glass as well as formation of the fillets 31 and 32.

As pointed out above, the outer separator strip 23 is secured to both glass sheets, while the inner separator strip 24 is secured to one of the glass sheets only leaving the small gap or crack $a$ along its opposite edge through which air may pass into and from the space between the glass sheets, and in so doing contact the dehydrating material which absorbs the moisture therefrom. The outer separator strip 23 can then be punctured as at 28 to equalize air pressures at all times. Any air entering the unit would come into contact with the dehydrating material or desiccant can be dried. Should the desiccant adjoining the opening become fully charged with moisture, the entering moisture would temporarily pass into the unit but would continue to travel toward the balance of the desiccant in the unit and so maintain a dehydrated air space. The desiccant surrounds the unit at all edges, providing the maximum of exposure of the desiccant to the air in the space between the glass sheets. Furthermore, instead of being localized, all places where possible leakage of air can take place have a barrier of the desiccant interposed between the leak and the air space between the glass sheets. Thus, it will be seen that there is provided an excessive amount of desiccant for long life of the unit and that the use of fixed, inside-sealed or tube-connected cartridges is eliminated.

In Figs. 9 to 13 is illustrated a modified type of glazing unit and method of fabricating the same. In the construction of this unit, the inner and outer metal separator strips 23 and 24 are secured to the first sheet of glass 20 in the manner above described and, in addition, the inner separator strip 24 is also secured to both glass sheets. Further, both separator strips are vented, with the vents being preferably located at opposite ends of the unit so that the air passing from or into the space between the sheets will be caused to follow a relatively long path.

Figure 9:
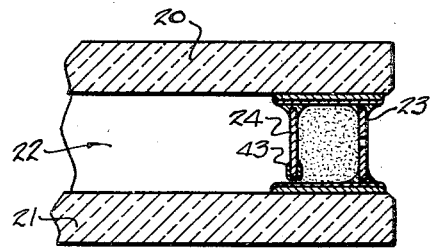
Figs. 9, 10, 11 and 12 are views illustrating four different steps in the method of fabricating a modified type of unit.
Figure 10:
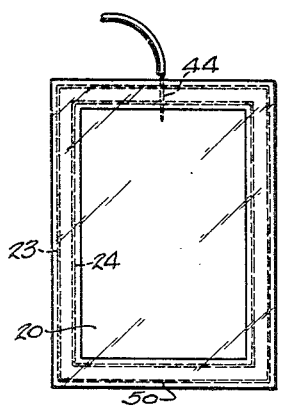
Figure 12:
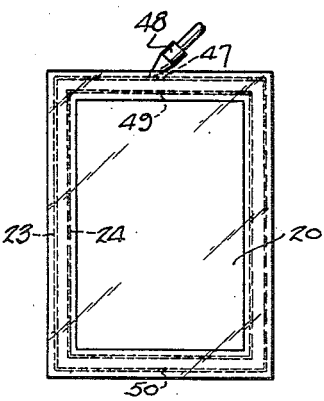
Figure 11:
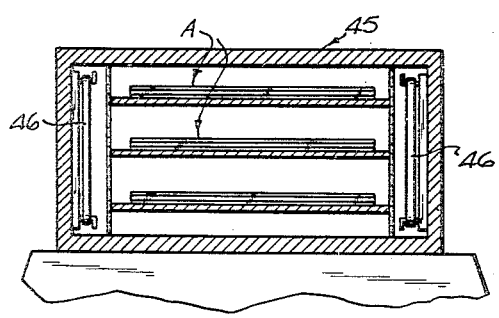
Figure 13:
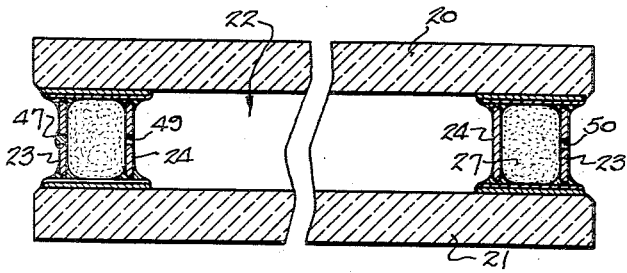
Fig. 13 is a transverse section through the finished modified type of unit.

More particularly, in preparing the inner separator strip 24, a deposit 43 of a very low melting point solder is applied to one edge thereof as in Fig. 9. The solder for this purpose can have a melting point as low as 160° F. After the entire unit has been assembled as previously described, nitrogen or some inert gas is passed into the space between the sheets to replace the air and this can be accomplished by inserting through both the inner and outer separator strips a hypodermic needle or the like 44 (Fig. 10). The unit indicated at A is then placed in an oven 45 as shown in Fig. 11, which may be heated by the electrical heating elements or in any other desired manner, and the unit raised to a temperature sufficiently high to cause the low melting point solder 43 on the inner separator strip to liquify and to fuse with the solder on the glass surface. The purpose of the nitrogen is to prevent oxidation of the solder before this fusing has taken place. Because the solder on the balance of the unit will have a higher melting point, there should be no flowing of this solder. Some of the inert gas such as nitrogen or $CO_2$ would escape but with the constantly rising temperature in the oven there would be no inward flow of air until after the fusion of the soft solder had taken place. Several other methods of assembly might be used to bring about the soldering of the inner separator strip to the second sheet of glass, such as by heated plates brought into contact with the glass surfaces with or without pressure, radiant heat applied to the glass edges, etc.

In order to prevent internal pressures, the outer separator strip 23 would normally be punctured at one end of the unit and the inner separator strip 24 at the other end. To this end, when the hypodermic needle 44 is removed, the opening in the outer separator strip can be soldered closed as indicated at 47 in Fig. 12 by use of an iron 48. The opening 49 in the inner separator strip is left open and an opening 50 formed in the outer separator strip at the opposite end of the unit. With this construction, it will be evident that the air entering or leaving the unit will have to travel through the desiccant over a relatively greater distance.

Figure 14:
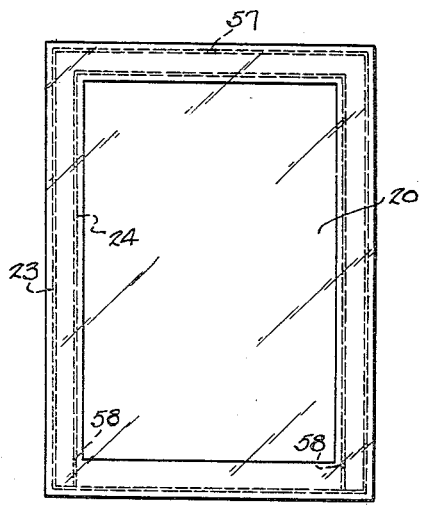
Figs. 14 and 15 are plan views showing two other modified types of units.

If desired, the inner metal separator strip 24 need not extend around all four edges of the unit but may be limited to one, two or three sides thereof, as indicated in Fig. 14. In this type of unit, the outer separator strip is provided with a vent opening 57 at one end of the unit and the inner separator strip with vent openings 58 adjacent the opposite end of the unit.

Figure 15:
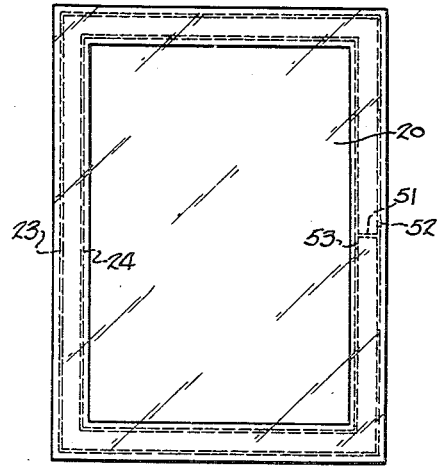

In order to still further increase the travel of the air entering or leaving the unit, the space between the two separator strips might be closed off by a suitable transverse partition 51 as shown in Fig. 15, with the outer separator strip being provided with an opening 52 at one side of the partition and the inner separator strip with an opening 53 at the opposite side of the partition, thus causing any air entering or leaving the air space to travel through the desiccant completely around the perimeter of the unit.

Figure 16:
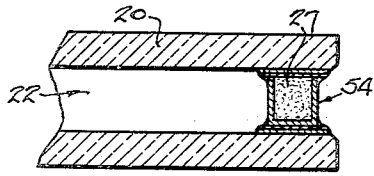
Figs. 16, 17 and 18 are transverse sections showing modified types of metal separators.
Figure 17:
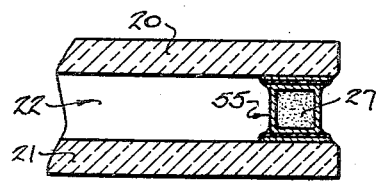
Figure 18:
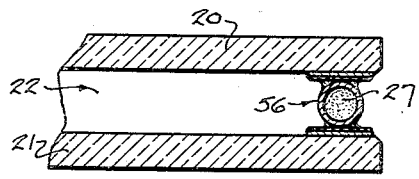

In Figs. 16, 17 and 18 are shown three modified types of metal separators which could be used and soldered to the metallic coatings on the glass sheets. Thus, a separator 54 of U-shaped channel formation may be employed as in Fig. 16; a separator 55 of hollow, substantially rectangular formation in cross section as in Fig. 17; or a separator 56 of tubular formation in cross section as in Fig. 18. In each of these constructions, the separator is filled with the dehydrating material 27 and the said separator may be vented by an opening to the space between the glass sheets only or to both the air space and the atmosphere as explained above.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

I claim:

1. A multiple glazed unit, comprising a pair of glass plates arranged in spaced substantially parallel relation to provide an insulating air space therebetween, a separator positioned between and secured to the glass plates adjacent the margins thereof, a second separator positioned between and secured to the glass plates and spaced inwardly from the first separator to form a chamber therebetween, a dehydrating material arranged within said chamber, and openings formed in said first and second separators placing the said chamber in communication with the space between the glass plates and also with the atmosphere.

2. A multiple glazed unit, comprising a pair of glass plates arranged in spaced substantially parallel relation to provide an insulating air space therebetween, metallic coatings adherent to the inner adjacent faces of the glass plates around the marginal portions thereof, metal separator means positioned between the glass plates and secured to the metallic coatings thereon, said separator means having spaced inner and outer portions forming a chamber therebetween, a dehydrating material arranged within said chamber, and openings formed in the inner and outer portions of said separator means placing the said chamber in communication with the space between the glass plates and also with the atmosphere.

3. A multiple glazed unit, comprising a pair of glass plates arranged in spaced substantially parallel relation to provide an insulating air space therebetween, metallic coatings adherent to the inner adjacent faces of the glass plates around the marginal portions thereof, a metal separator positioned between the glass plates and secured to the metallic coatings thereon, a second metal separator positioned between the glass plates and secured to the metallic coatings thereon inwardly from the first metal separator to form a chamber therebetween, a dehydrating material disposed within said chamber, and openings formed in the inner and outer metal separators placing the said chamber in communication with the space between the glass plates and also with the atmosphere.

4. A multiple glazed unit, comprising a pair of glass plates arranged in spaced substantially parallel relation to provide an insulating air space therebetween, metallic coatings applied to the inner adjacent faces of both glass sheets around the marginal portions thereof, an outer metal spacer positioned between the glass plates and secured to the metallic coatings thereon, a second metal spacer positioned between the glass plates inwardly of the first metal spacer and secured to only one of said metallic coatings, and a dehydrating material disposed between the metal spacers and exposed to the air within the space between the glass plates.

5. A multiple glazed unit, comprising a pair of glass plates arranged in spaced substantially parallel relation to provide an insulating air space therebetween, metallic coatings applied to the inner adjacent faces of both glass sheets around the marginal portions thereof, an outer metal spacer positioned between the glass plates and secured to the metallic coatings thereon, a second metal spacer positioned between the glass plates inwardly of the first metal spacer and secured to only one of said metallic coatings, a dehydrating material disposed between the metal spacers and exposed to the air within the space between the glass plates, and a vent opening formed in the outer metal spacer.

6. A multiple glazed unit, comprising a pair of glass plates arranged in spaced substantially parallel relation to provide an insulating air space therebetween, metallic coatings applied to the inner adjacent faces of the glass sheets around the marginal portions thereof, a metal separator of tubular formation in cross section positioned between the glass plates and secured to the metallic coatings thereon, a dehydrating material arranged within said separator, and openings in said metal separator exposing the dehydrating material to the air within the space between the glass plates and also to the atmosphere.

7. A multiple glazed unit, comprising a pair of glass plates arranged in spaced substantially parallel relation to provide an insulating air space therebetween, separator means positioned between the glass plates and secured thereto adjacent the margins thereof, said separator means having spaced inner and outer walls forming a chamber therebetween extending around the margin of the unit, a dehydrating material filling said chamber, an opening in the inner wall of the separator means placing the space between the glass plates in communication with the chamber, and an opening in the outer wall of the separator means and out of alignment with the opening in said inner wall placing said chamber in communication with the atmosphere whereby air passing from the atmosphere to the insulated air space will follow a tortuous path through said dehydrating material.

8. A multiple glazed unit, comprising a pair of glass plates arranged in spaced substantially parallel relation to provide an insulating air space therebetween, metallic coatings adherent to the inner adjacent faces of the glass plates around the marginal portions thereof, metal separator means positioned between the glass plates and secured to the metallic coatings thereon, said separator means having spaced inner and outer walls forming a chamber therebetween extending around the margin of the unit, a dehydrating material filling said chamber, an opening in the inner wall of the separator means placing the space between the glass plates in communication with the chamber, and an opening in the outer wall of the separator means and out of alignment with the opening in said inner wall placing said chamber in communication with the atmosphere whereby air passing from the atmosphere to the insulated air space will follow a tortuous path through said dehydrating material.

9. A multiple glazed unit, comprising a pair of glass plates arranged in spaced substantially parallel relation to provide an insulating air space therebetween, separator means positioned between the glass plates adjacent the margins thereof, said separator means having spaced inner and outer walls, said outer wall extending between and being secured to both of said glass plates and said inner wall being secured to only one of said glass plates and terminating short of the other of said glass plates, and a dehydrating material disposed between said walls and exposed to the air within the space between the glass sheets.

10. A multiple glazed unit, comprising a pair of glass plates arranged in spaced substantially parallel relation to provide an insulating air space therebetween, separator means positioned between the glass plates adjacent the margins thereof, said separator means having spaced inner and outer walls, said outer wall extending between and being secured to both of said glass plates and said inner wall being secured to only one of said glass plates and terminating short of the other of said glass plates, a dehydrating material disposed between said walls and exposed to the air within the space between the glass sheets, and a vent opening formed in the outer wall.

11. A multiple glazed unit, comprising a pair of glass plates arranged in spaced substantially parallel relation to provide an insulating air space therebetween, separator means positioned between the glass plates and secured thereto adjacent the margins thereof, said separator means having spaced inner and outer portions forming a chamber therebetween, a dehydrating material arranged within said chamber, and openings formed in the inner and outer portions of said separator means placing the said chamber in communication with the space between the glass plates and also with the atmosphere.

CHARLES D. HAVEN.

REFERENCES CITED

The following references are of record in the file of this patent:

UNITED STATES PATENTS

| Number | Name | Date |
| --- | --- | --- |
| 2,235,680 | Haven | Mar. 18, 1941 |
| 2,103,532 | Hunter | Dec. 28, 1937 |
| 2,306,327 | Baldwin | Dec. 22, 1942 |
| 2,077,305 | Batchell | Apr. 13, 1937 |

FOREIGN PATENTS

| Number | Country | Date |
| --- | --- | --- |
| 515,085 | British | Nov. 24, 1939 |